(12) United States Patent
Cohen et al.

(10) Patent No.: US 7,497,570 B2
(45) Date of Patent: Mar. 3, 2009

(54) ADJUSTABLE NOSE PAD SYSTEM

(75) Inventors: Andrew Cohen, Overland Park, KS (US); Danielle LaGace, Shawnee, KS (US)

(73) Assignee: Bushnell, Inc., Overland Park, KS (US)

( * ) Notice: Subject to any disclaimer, the term of this patent is extended or adjusted under 35 U.S.C. 154(b) by 0 days.

(21) Appl. No.: 11/382,782

(22) Filed: May 11, 2006

(65) Prior Publication Data

US 2007/0263168 A1    Nov. 15, 2007

(51) Int. Cl.
*G02C 5/12* (2006.01)
*G02C 7/08* (2006.01)

(52) U.S. Cl. .............................. 351/137; 351/47; 351/57
(58) Field of Classification Search ................... 351/47, 351/48, 57, 58, 78–82, 136–139, 41
See application file for complete search history.

(56) References Cited

U.S. PATENT DOCUMENTS

| | | | | |
|---|---|---|---|---|
| 1,784,013 A | * | 12/1930 | Kern | 351/90 |
| 4,029,403 A | * | 6/1977 | Harris | 351/121 |
| 4,500,179 A | * | 2/1985 | Schonhut | 351/137 |
| 5,412,438 A | * | 5/1995 | Bolle' | 351/44 |
| 5,825,453 A | * | 10/1998 | Baragar et al. | 351/137 |
| 6,520,636 B2 | * | 2/2003 | Saitoh et al. | 351/137 |

* cited by examiner

*Primary Examiner*—Huy K Mai
(74) *Attorney, Agent, or Firm*—Hovey Williams LLP

(57) ABSTRACT

An adjustable and detachable nose pad assembly (22) for eyeglasses (10) is provided and includes a central bridge section (24) with a pair of obliquely oriented and diverging posts (26) each supporting a nose pad (34, 36). Each nose pad (34, 36) is shiftable relative to an associated post (26) and can be locked in place in a desired position by means of a mechanical interlock assembly (44, 46). The bridge section (24) has a pair of hook elements (30, 32) which are designed for seating within complemental recesses (50, 52) formed in the bridge (16) of eyeglasses (10); in this manner, the assembly (22) may be selectively detached from the eyeglasses (10) for adjustment, and then can be reattached. The invention also provides an eyewear assembly (64) including primary eyeglasses (10), a detachable nose pad assembly (22), and an auxiliary eyeglass unit (54) also provided with a nose pad assembly (62) similar to the assembly (22). The primary eyeglasses (10) may be used in the normal fashion with assembly (22), or alternately the unit (54) may be secured to the primary eyeglasses (10).

28 Claims, 3 Drawing Sheets

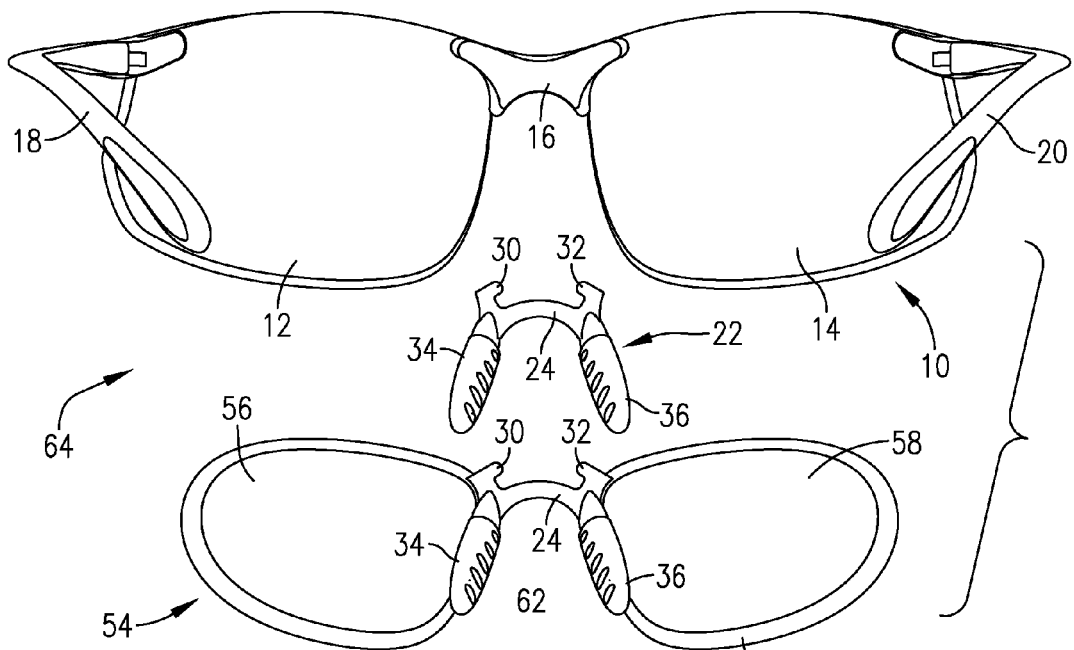
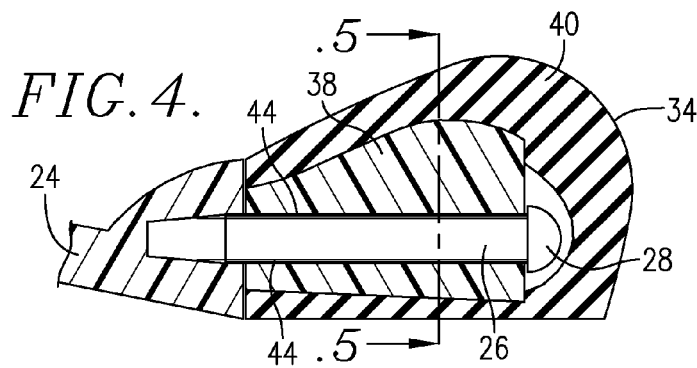
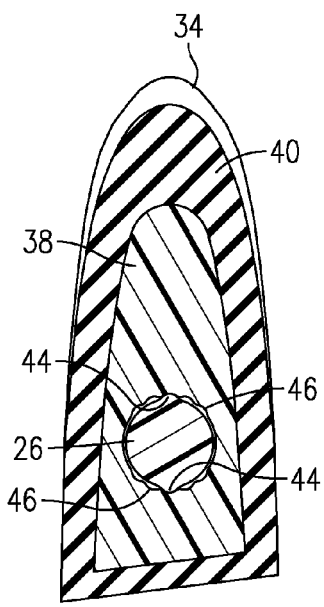
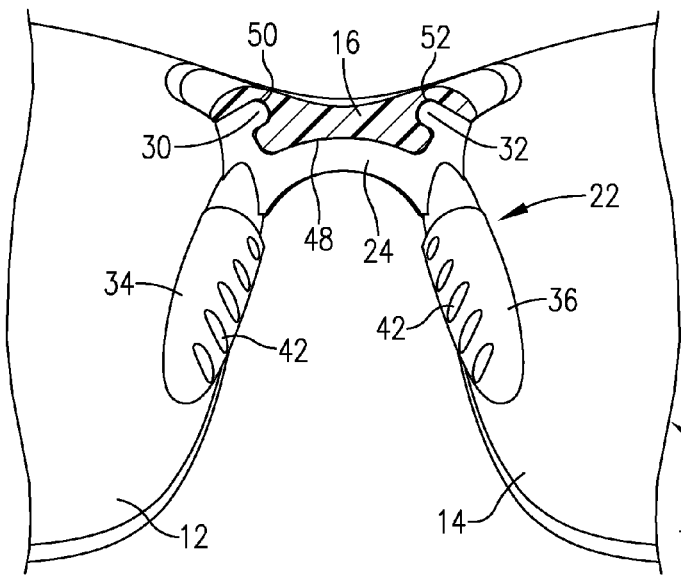

ADJUSTABLE NOSE PAD SYSTEM

BACKGROUND OF THE INVENTION

1. Field of the Invention

The present invention is broadly concerned with improved, adjustable eyeglass nose pad assemblies allowing a user to precisely adjust the nose-engaging pads thereof to achieve proper fit and maximum comfort. More particularly, it is concerned with such nose pad assemblies, as well as complete eyeglasses and multiple-part eyewear assemblies, wherein the nose pad assemblies are selectively adjustable and also detachable from the associated eyeglasses.

2. Description of the Prior Art

Eyeglasses must be carefully fitted to a wearer's face, in order to be comfortable over long wearing times and to provide the proper degree of eyesight correction. There are many adjustments and measurements that must be made to accommodate an eyeglass prescription for a wearer, including frame width, pupil separation, temple length, pantoscopic angle, and the shape and size of the nose pad assembly. Eyeglasses are supported on the wearer's face by resting on the bridge of the wearer's nose, and by the temples which rest upon the wearer's ears. Because most of the weight of the glasses is in the lenses, it follows that the majority of the weight rests upon the wearer's nose. In the case of eyeglasses having glass lenses with high magnification prescriptions, this weight can be considerable.

A variety of nose pad assemblies have been provided in the past to distribute the weight of eyeglasses. In the case of plastic rimmed glasses, a nose pad assembly is also integrally molded with the frame, being positioned near the juncture of the eyewires. A major drawback of these designs is that, once manufactured, the frame cannot be customized to a particular wearer's nose. Therefore, in order to provide a wide variety of frames, and to be able to accommodate different nose shapes and sizes, an optometrist must stock a large number of frames. In practice, each frame size and style has its own nose pad assembly, and the user is faced with little opportunity for customization. As a result, many sizes and styles of eyeglasses may be uncomfortable for many wearers.

It is also known to provide nose pad assemblies that are attached to the eyeglass frame with an attachment that permits slight manipulations. For example, the standard nose pad assemblies on wire frame glasses includes disk-like pads attached through a swivel to a metal wire which is welded to the eyewires. The swivel adjusts to a small degree, and also the metal wire may be carefully bent and shaped for accommodation purposes. A drawback of these designs is that the metal wire is fragile and may become bent or broken. Additionally, adjustment is difficult and requires special tools and expertise. Finally, these nose pads tend to concentrate the weight of the glasses on two localized regions on either side of the nose, which may cause irritation over time.

Attempts have also been made in the past to provide nose pad assemblies with greater degrees of adjustment, see U.S. Pat. Nos. 6,520,636, 4,783,163, and 4,787,729. It has also been suggested to provide nose pad assemblies which are detachable from eyeglass frames, as exemplified in U.S. Pat. Nos. 4,704,015, 5,291,230, and 6,056,399.

SUMMARY OF THE INVENTION

The adjustable eyeglass nose pad assemblies of the invention broadly comprise a pair of opposed nose-engaging pads each including an elongated post and a nose pad body disposed about the post, the nose pad body being shiftable about and relative to the post. Mechanical interlock assemblies also form a part of the invention and are operable to permit each of the pads to be locked in a desired, shifted position relative to the associated post. In this way, the respective pads of the nose pad assembly can be individually adjusted for maximum wearer comfort.

In preferred forms, the interlock assemblies comprise detent interlocks, with one of the post and pad having a series of recesses formed therein, and with the other of the post and pad having at least one outwardly projecting rib. In this way, the ribs are oriented to be received within a respective recess in order to lock the associated nose pad in a desired position. In one embodiment, the nose pads are provided with plural recesses, whereas the associated post has a pair of opposed, projecting ribs.

In further preferred forms each nose pad body has an inner section receiving the associated post, and an outer section disposed about the inner section. In order to provide the best performance, the outer section is formed of a material which is softer than the inner section.

Advantageously, the nose pad assemblies of the invention are also detachable from an eyeglass frame or bridge, having a central bridge section with the pad-supporting posts extending downwardly from the bridge section. The bridge section has a pair of hook elements which are received within corresponding recesses formed in the eyeglass frame or bridge.

The invention also provides eyewear assemblies having a pair of primary eyeglasses including a pair of adjacent lenses, a bridge between the lenses, and a pair of temples. A nose pad assembly for the primary eyeglasses is also provided and includes a pair of opposed nose-engaging pads, and structure operable to detachably secure the nose pad assembly to the primary eyeglass bridge. The overall eyewear assembly further includes an auxiliary eyeglass unit including a pair of adjacent lenses, a nose pad assembly between the lenses, and structure operable to detachably secure the auxiliary eyeglass unit to the primary eyeglass bridge, with the eyeglass unit lenses adjacent the primary eyeglass lenses. The nose pad assembly and auxiliary eyeglass unit are alternately attachable to the primary eyeglass bridge.

Preferably, the detachable nose pad assembly and that of the auxiliary eyeglass unit are of the type described, in that each comprises a pair of opposed nose-engaging pads each including an elongated post and a nose pad body disposed about the post, the nose pad body being shiftable about and relative to the post. The detachable nose pad assembly and auxiliary eyeglass unit each afford a mechanical interlock assembly operable to permit each of the pads to be locked in a desired, shifted position relative to the associated post.

Eyewear assemblies of the invention are particularly suited for situations where the primary eyeglasses are darkened lens sunglasses, whereas the auxiliary eyeglass unit provides eyesight correction lenses. Thus, a user may attach the auxiliary eyeglass unit to the primary sunglasses to give a combined assembly for outdoor wear with full vision correction.

BRIEF DESCRIPTION OF THE DRAWINGS

FIG. 3 is an enlarged, fragmentary view in partial section depicting the snap-type interconnection of the preferred nose pad assembly and an eyeglass bridge;

FIG. 4 is a greatly enlarged, fragmentary sectional view illustrating the construction of the preferred nose pad assembly;

FIG. 5 is a vertical sectional view taken along line 5-5 of FIG. 4 and further illustrating the preferred interlock structure forming a part of the nose pad assembly;

FIG. 8 is an elevational view illustrating the components of an eyewear assembly made up of primary eyeglasses, a detachable, adjustable nose pad assembly for the primary eyeglasses, and an alternately usable auxiliary eyeglass unit.

DETAILED DESCRIPTION OF THE PREFERRED EMBODIMENT

Figure 1:
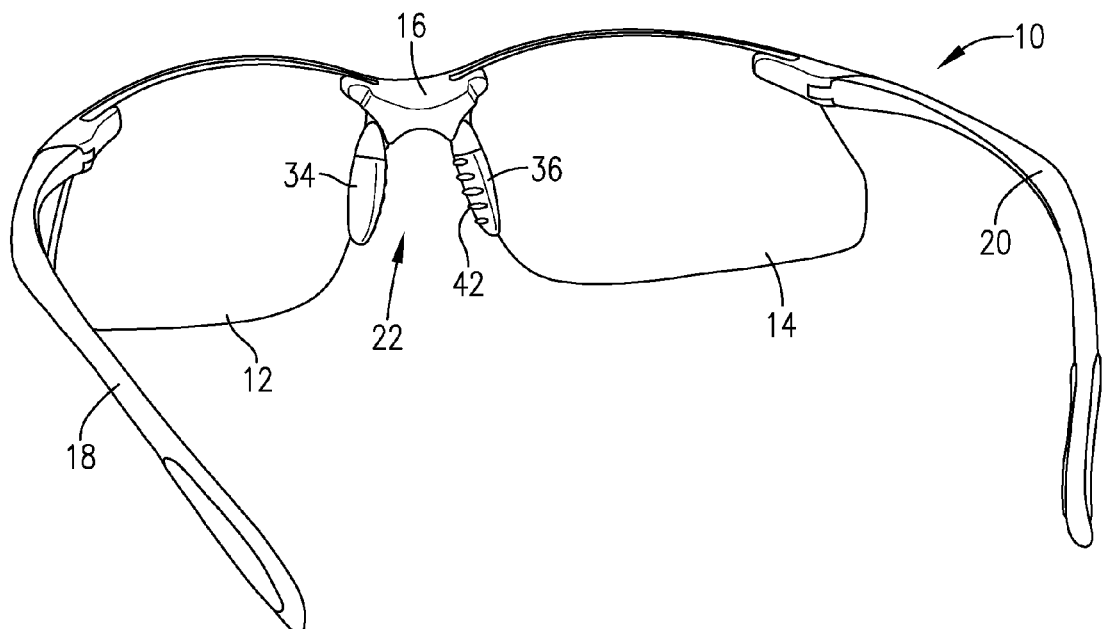
FIG. 1 is a perspective view of a pair of eyeglasses including the preferred nose pad assembly of the invention.
Figure 2:
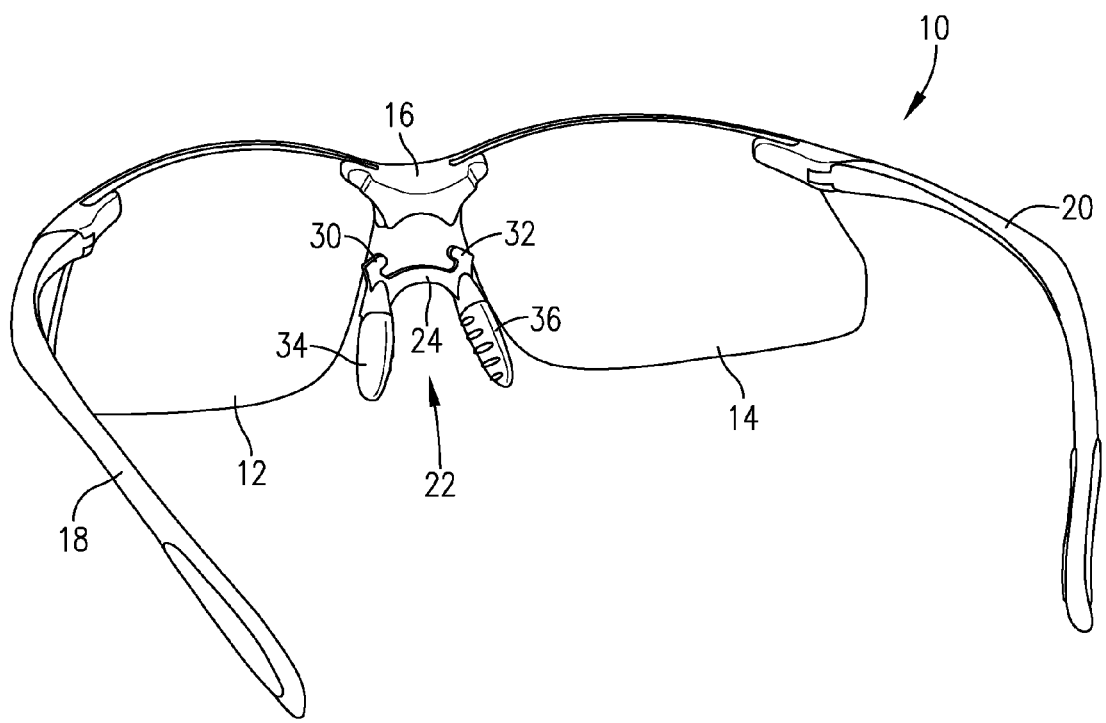
FIG. 2 is a perspective view similar to that of FIG. 1, but showing the nose pad assembly detached from the eyeglass bridge.

Turning now to the drawings, and particularly FIGS. 1 and 2, eyeglasses 10 are illustrated broadly including a pair of adjacent lenses 12, 14, a bridge 16 between the lenses, and a pair of hinged temples 18, 20 secured adjacent the outboard margins of the lenses 12, 14. In addition, the eyeglasses 10 include a nose pad assembly 22 which is detachably securable to bridge 16. In addition, the nose pad assembly 22 is adjustable to facilitate the fitting of eyeglasses 10 to a wearer with maximum comfort.

The nose pad assembly 22 is made up of a central, arcuate bridge section 24 with a pair of opposed, integral, angularly diverging posts 26 each terminating in an enlarged head 28 (FIG. 4). The bridge section 24 has a pair of opposed, side marginal, inwardly extending hook elements 30, 32 which are important for purposes to be described. Each post 26 supports a two-piece nose-engaging pad 34, 36 each made up of an inner section 38 and an outer surrounding section 40. As best viewed in FIGS. 4 and 5, it will be seen that the post 26 extends completely through the inner sections 38, with the heads 28 engaging the undersides thereof. Preferably, the posts 26 extend along the length of the associated nose pads a distance of at least about 50% (more preferably at least about 75%) of the length of the nose pads. The inwardly extending hook elements 30,32, the inner sections 38, the posts 26, and bridge section 24, are preferably composed of a shape-retaining but slightly yieldable and resilient nylon synthetic resin material, such as TR90LX or TR90. The hook elements 30,32 and the bridge section 24 are preferably made of a material that has an ISO 2039-1 durometer value preferably from about 80 MPa to about 140 MPA, more preferably from about 100 MPa to about 120 MPA, most preferably about 110 MPa. The posts 26 and the inner sections 38 are preferably made of a material that has an ISO 2039-1 durometer value preferably from about 70 MPa to about 110 MPa, more preferably from about 80 MPa to about 100 MPa, most preferably about 90 MPa. The outer section 40 of each nose pad is molded about the corresponding inner section 38 and is preferably formed of a soft, rubber-like synthetic resin material, such as Rabalon MJ6301C, having a Shore A (JIS K 6253-1993) durometer value of from about 40 to about 80, more preferably from about 50 to about 70, most preferably about 60. The inner nose-engaging surfaces of the outer sections 40 are advantageously provided with gripping ridges 42.

Each nose pad 34, 36 is adjustable about its corresponding post 26, and can be locked in a desired, adjusted position. Again referring to FIGS. 4 and 5, it will be seen that each post 26 has a pair of elongated, axially extending, outwardly projecting locking ribs 44, whereas the adjacent inner section 38 have a plurality of circumferentially spaced apart, elongated recesses 46 sized and located to receive the ribs 44. It will thus be appreciated that the nose pads 34 and 36 may be individually shifted or twisted about and relative to the associated post 26 until a desired comfort position is reached, whereupon the adjusted pads will be retained in position owing to the detent interlock afforded by the ribs 44 and recess 46.

The nose pad assembly 22 is also detachably secured to the eyeglass bridge 16. The latter has an arcuate slot 48 formed in the underside thereof, as well as a pair of opposed, endmost recesses 50, 52 adapted to receive the hook elements 30, 32. As best seen in FIG. 3, the nose pad assembly 22 may thus be easily and securely attached to bridge 16 by slightly compressing together the nose pads 34, 36 in order to spread the hook elements 30, 32, followed by placement of bridge section 24 within slot 48. The nose pads 34, 36 are then released, causing the hook elements 30, 32 to seat within the recesses 50, 52.

Figure 6:
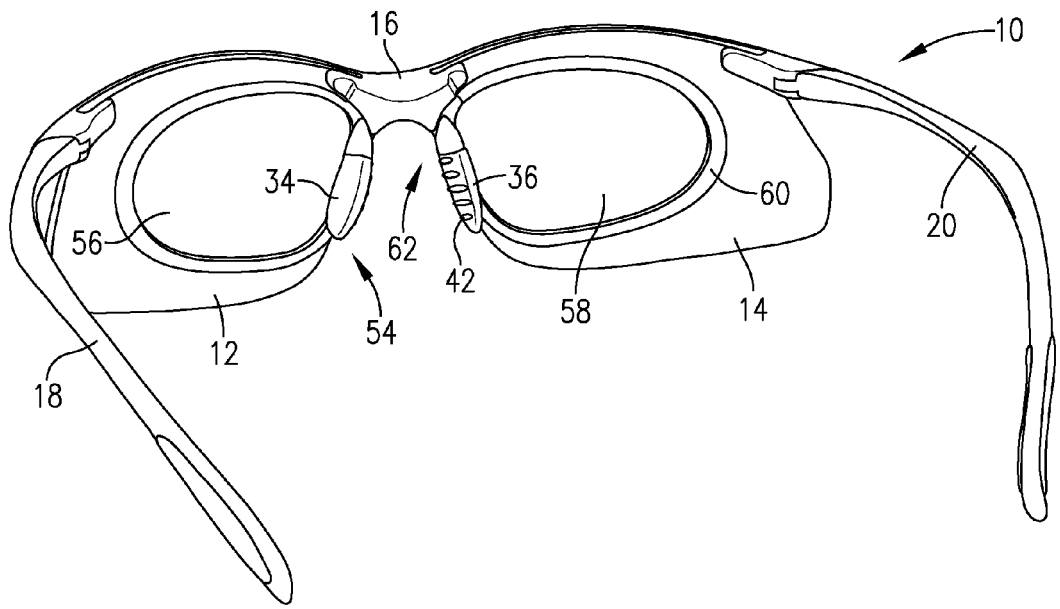
FIG. 6 is a perspective view of an eyewear assembly including primary eyeglasses with an auxiliary eyeglass unit secured to the primary eyeglasses.
Figure 7:
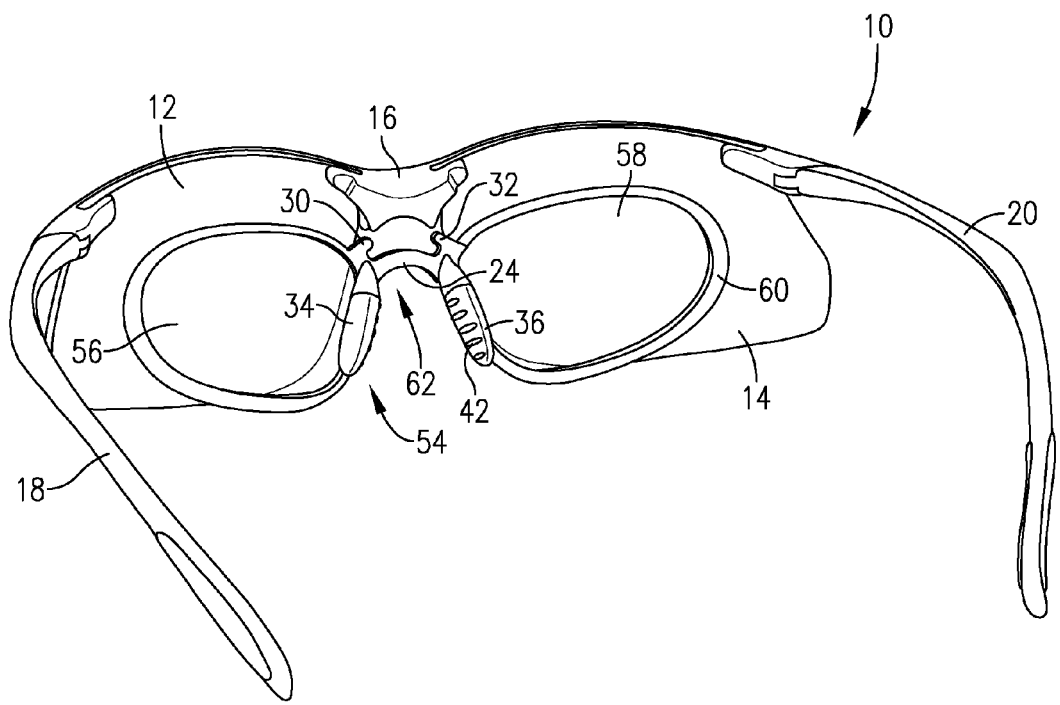
FIG. 7 is a view similar to that of FIG. 6, but showing the auxiliary eyeglass unit detached from the primary eyeglasses.

The eyeglasses 10 may be used with an auxiliary eyeglass unit 54, as depicted in FIGS. 6 and 7. The unit 54 has a pair of lenses 56, 58 supported by a frame 60. The frame 60 includes a nose pad assembly 62 which is identical with previously described nose pad assembly 22, except that the assembly 62 is fixedly secured to the frame 60. Accordingly, the same reference numerals used in the description of assembly 22 are used in connection with assembly 62. Thus, the nose pad assembly 62 of auxiliary unit 54 may be used to attach the unit 54 to bridge 16 of eyeglasses 10, in the same manner as described previously with reference to the detachable nose pad assembly 22.

In one embodiment, the eyeglasses 10 would be in the form of conventional darkened sunglasses, whereas the unit 54 would have vision correction lenses 56, 58. Thus, the user could attach the unit 54 such that the lenses 56, 58 thereof are in close adjacency with sunglass lenses 12 and 14.

FIG. 8 illustrates a complete eyewear assembly 64 made up of eyeglasses 10, auxiliary unit 54, and detachable nose piece assembly 22. As will be readily appreciated from the foregoing discussion, a user may install the unit 22 onto eyeglasses 10 for normal wearing. In the event that the user wishes to employ the auxiliary unit 54, it is only necessary to detach the nose pad assembly 22 and install the unit 54 in its place. Thus, the overall assembly 64 provides multi-functional utility for a user, while at the same time assuring that the improved nose pad assembly of the invention is present in all alternative uses.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

We claim:

1. An adjustable eyeglass nose pad assembly, comprising:
   a pair of opposed nose-engaging pads each including an elongated post and a nose pad body disposed about the post, said nose pad body being retainably rotatable about a longitudinal axis of said post and said nose pad and relative to said post; and
   a mechanical interlock assembly operable to permit each of said pads to be locked in a desired, rotated position relative to the associated post.

2. The nose pad assembly of claim 1, each of said posts extending along the length of the associated nose pad a distance of at least about 50% of the length of the nose pad.

3. The nose pad assembly of claim 1, said interlock assembly comprising a detent interlock, with one of said post and pad having a series of recesses formed therein, and with the other of the post and pad having at least one outwardly projecting rib, said rib oriented to be received within a respective recess.

4. The nose pad assembly of claim 3, said pad having said recesses, and said post having said projecting rib.

5. The nose pad assembly of claim 1, said nose pad body having an inner section receiving said post, and an outer section disposed about the inner section, said outer section being softer than said inner section.

6. The nose pad assembly of claim 5, said inner section formed of relatively rigid nylon material, said outer section formed of relatively soft, rubber-like synthetic resin material.

7. The nose pad assembly of claim 1, including a bridge section interconnecting said elongated posts.

8. The nose pad assembly of claim 1, including a detachable connection structure permitting the nose pad assembly to be detachably connected to an eyeglass bridge.

9. The nose pad assembly of claim 8, said detachable connection structure comprising a bridge section interconnecting said elongated posts, said bridge section including a pair of opposed hook elements.

10. Eyeglasses, comprising:
   a pair of adjacent lens holders having a bridge therebetween; and
   a nose pad assembly operably coupled to said bridge, including
      a pair of opposed nose-engaging pads each including an elongated post and a nose pad body disposed about the post, said nose pad body being retainably rotatable about a longitudinal axis of said post and said nose pad and relative to said post; and
      a mechanical interlock assembly operable to permit each of said pads to be locked in a desired, rotated position relative to the associated post.

11. The eyeglasses of claim 10, each of said posts extending along the length of the associated nose pad a distance of at least about 50% of the length of the nose pad.

12. The eyeglasses of claim 10, said interlock assembly comprising a detent interlock, with one of said post and pad having a series of recesses formed therein, and with the other of the post and pad having at least one outwardly projecting rib, said rib oriented to be received within a respective recess.

13. The eyeglasses of claim 12, said pad having said recesses, and said post having said projecting rib.

14. The eyeglasses of claim 10, said nose pad body having an inner section receiving said post, and an outer section disposed about the inner section, said outer section being softer than said inner section.

15. The eyeglasses of claim 14, said inner section formed of relatively rigid nylon material, said outer section formed of relatively soft, rubber-like synthetic resin material.

16. The eyeglasses of claim 10, including a bridge section interconnecting said elongated posts.

17. The eyeglasses of claim 10, including a detachable connection structure permitting the nose pad assembly to be detachably connected to said bridge.

18. The eyeglasses of claim 17, said detachable connection structure comprising a bridge section interconnecting said elongated posts, said bridge section including a pair of opposed hook elements, said eyeglass bridge having a pair of opposed, hook-receiving recesses.

19. An eyewear assembly, comprising:
   a pair of primary eyeglasses having a pair of adjacent lenses, a bridge between said lenses, and a pair of temples;
   a nose pad assembly for said primary eyeglasses and including a pair of opposed nose-engaging pads each including an elongated post and a nose pad body disposed about the post, said nose pad body being retainably rotatable about a longitudinal axis of said post and said nose pad and relative to said post, and structure operable to detachably secure the nose pad assembly to said primary eyeglass bridge;
   an auxiliary eyeglass unit including a pair of adjacent lenses, a nose pad assembly between the lenses, and structure operable to detachably secure the auxiliary eyeglass unit to said primary eyeglass bridge, with the eyeglass unit lenses adjacent the primary eyeglass lenses,
   said nose pad assembly and auxiliary eyeglass unit being alternately attachable to said primary eyeglass bridge.

20. The eyewear assembly of claim 19, the nose pad assembly of said primary eyeglasses, and the nose pad assembly of said auxiliary eyeglass unit, each comprising a pair of opposed nose-engaging pads each including an elongated post and a nose pad body disposed about the post, said nose pad body being retainably rotatable about and relative to said post, and a mechanical interlock assembly operable to permit each of said pads to be locked in a desired, rotated position relative to the associated post.

21. The eyewear assembly of claim 20, each of said posts extending along the length of the associated nose pad a distance of at least about 50% of the length of the nose pad.

22. The eyewear assembly of claim 20, said interlock assembly comprising a detent interlock, with one of said post and pad having a series of recesses formed therein, and with the other of the post and pad having at least one outwardly projecting rib, said rib oriented to be received within a respective recess.

23. The eyewear assembly of claim 22, said pad having said recesses, and said post having said projecting rib.

24. The eyewear assembly of claim 20, said nose pad body having an inner section receiving said post, and an outer section disposed about the inner section, said outer section being softer than said inner section.

25. The eyewear assembly of claim 24, said inner section formed of relatively rigid nylon material, said outer section formed of relatively soft, rubber-like synthetic resin material.

26. The eyewear assembly of claim 19, said primary eyeglass lenses being sunglass lenses, the lenses of said auxiliary eyeglass unit being smaller than said sunglass lenses.

27. An adjustable eyeglass nose pad assembly, comprising:
   a pair of opposed nose-engaging pads each including an elongated post and a nose pad body disposed about the post, said nose pad body being retainably rotatable about a longitudinal axis of said post and said nose pad and relative to said post; and
   a mechanical interlock assembly operable to permit each of said pads to be locked in a desired, rotated position relative to the associated post, said interlock assembly including at least one outwardly projecting rib formed along the longitudinal axis of each post and a plurality of inner recesses formed along the longitudinal axis of the interior of each pad such that each rib engages a recess to rotatably retain the position of said pad about said post.

28. An adjustable eyeglass nose pad assembly, comprising:
   a pair of opposed nose-engaging pads each including an elongated post and a nose pad body disposed about the post, said post including a head positioned at one end of said post configured to retain said nose pad about said post, said nose pad body being retainably rotatable about a longitudinal axis of said post and said nose pad and relative to said post; and
   a mechanical interlock assembly operable to permit each of said pads to be locked in a desired, rotated position relative to the associated post.

* * * * *